United States Patent [19]

Ratto et al.

[11] 4,362,860
[45] Dec. 7, 1982

[54] ADDITION CURING POLYSTYRYL PYRIDINE

[75] Inventors: Joseph J. Ratto, Thousand Oaks; Charles L. Hamermesh, Westlake Village, both of Calif.

[73] Assignee: Rockwell International Corporation, El Segundo, Calif.

[21] Appl. No.: 317,629

[22] Filed: Nov. 2, 1981

[51] Int. Cl.$^3$ .................. C08G 2/00; C08G 12/02; C08G 75/00
[52] U.S. Cl. ..................... 528/248; 528/246; 528/269
[58] Field of Search ............... 528/246, 248, 269

[56] References Cited

U.S. PATENT DOCUMENTS 3,792,020  2/1974  Huck et al. ............... 528/269 X
3,810,848  5/1974  Chapurlat et al. ......... 528/246 X
3,994,862  11/1976 Ropars et al. ............. 528/232

Primary Examiner—Lucille M. Phynes
Attorney, Agent, or Firm—H. Fredrick Hamann; Craig O. Malin

[57] ABSTRACT

A fire-resistant polystyryl pyridine polymer is provided by two separate reactions: (1) the condensation of a methylated pyridine, an aromatic dialdehyde, and a methyl vinyl pyridine; and (2) by the addition curing of the condensation product. The condensation product provides a prepolymer suitable for forming a composite with another material such as graphite fibers, and the addition reaction provides a means to cure the prepolymer without eliminating volatile products.

7 Claims, 2 Drawing Figures

ADDITION CURING POLYSTYRYL PYRIDINE

BACKGROUND OF THE INVENTION

This invention relates to the field of polymers and particularly to thermosetting polymers derived from substituted pyridine.

An important use for thermosetting polymers is as a matrix resin for composites. In particular, graphite fiber reinforced composites are being used in increasing quantities in a variety of applications because of the improved performance the graphite fibers give to the composite. However, the fire resistance of such composites is poor and limits the extent to which they can be used.

One approach to increasing the fire resistance of composites is to use a fire resistant resin to form the composite matrix. U.S. Pat. No. 3,994,862 describes a polystyryl pyridine (PSP) as having good thermal stability and being suitable for forming composites using fibrous materials including carbon fibers. The PSP polymer is formed by the condensation of a pyridine containing at least three methyl groups with an aromatic dialdehyde.

According to the prior patent, a viscous liquid or meltable prepolymer is first obtained by controlling the degree of polycondensation of the mixture. This prepolymer is then used to fabricate a composite structure. Briefly, the reaction of the ingredients is halted prior to complete condensation, the resulting prepolymer is applied to the fibrous material, the composite (prepolymer plus fibrous material) is formed, and finally the formed composite is cured by heating it to about 200° C. to 300° C. to complete the condensation. Thus, the second step of curing the prepolymer is simply a continuation of the condensation reaction used to create the prepolymer in the first step.

An example of the reaction used to create and cure PSP based upon the condensation of a polymethyl pyridine (2,4,6-collidine) and terephthaldicarboxaldehyde is shown below. Note that both PSP and water are products of this condensation.

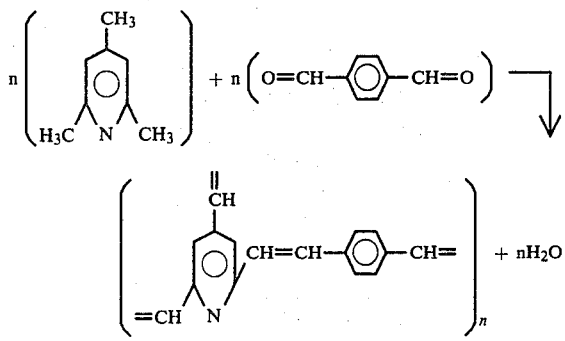

SUMMARY OF THE INVENTION

It is an object of the invention to provide an addition curing polystyryl pyridine.

It is an object of the invention to provide a polystyryl pyridine prepolymer which is formed by condensation and which is cured subsequently by addition.

It is an object of the invention to provide a polystyryl pyridine prepolymer which can be cured without the generation of water as a by-product.

It is an object of the invention to provide a polystyryl pyridine prepolymer having vinyl terminal unsaturation.

It is an object of the invention to provide a matrix resin for composites which has improved processability and improved resistance to fire.

According to the invention, a polystyryl pyridine (PSP) prepolymer is provided with methyl vinyl pyridine terminal unsaturation by condensation of a mixture of methylated pyridine, an aromatic dialdehyde, and a methyl vinyl pyridine. This prepolymer can be used to coat fibers, such as graphite fibers, and form a composite structure. The composite structure can then be cured by crosslinking the prepolymer via the unsaturation. This second reaction, an addition reaction, avoids the generation of gases because no gaseous condensation products are formed.

DESCRIPTION OF THE PREFERRED EMBODIMENTS

Figure 1:
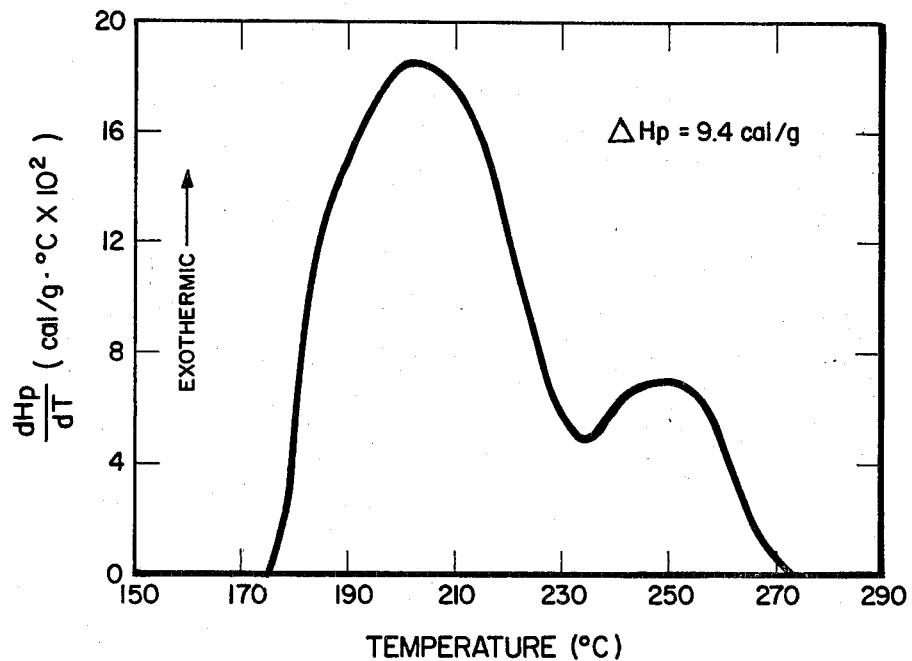
FIG. 1 is a differential scanning calorimetry curing thermogram for addition curing polystyryl pyridine (APSP)

The polymer polystyryl pyridine (PSP) has excellent properties at elevated temperatures and in the presence of moisture, as well as a high char yield (ca. 70%) in nitrogen. These properties are particularly desirable for the matrix resin of graphite fiber composites which may be subjected to fire. However, PSP is cured by a condensation reaction which generates water, resulting in unwanted gases which can produce voids in the composite.

It has been discovered that the PSP chain can be terminated with unsaturated methyl vinyl pyridine during the condensation reaction. The resulting prepolymer can then be cured by an addition reaction, namely by crosslinking the prepolymer via the unsaturation. The addition reaction does not generate water and consequently the prepolymer can be cured without the problems created by volatile water.

Termination of the PSP chain is accomplished by reacting a methylated pyridine, an aromatic dialdehyde, and a methyl vinyl pyridine. The resulting condensation products are water and a prepolymer termed an addition curing polystyryl pyridine (APSP). This condensation reaction can be represented by the following general equation:

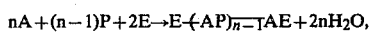

where:
P is a methylated pyridine, E is a methyl vinyl pyridine, and
A is an aromatic dialdehyde.

The repeating ("n" times) chain unit of the prepolymer is —AP— (the PSP polymer) and it is terminated with E (the unsaturated methyl vinyl pyridine). This condensation is a low energy reaction which can take place at about 115° C.

The prepolymer, E$\pm$(AP)$_{\overline{n-1}}$AE, produced by the above described condensation reaction can be applied to a fiber or fabric to make prepreg from which a laminate can be prepared and cured to form, for example, a graphite composite.

An important feature of the invention is the fact that curing of the prepolymer is by an addition reaction, rather than by a continuation of the condensation reaction which was used to produce the prepolymer. During the addition reaction, the prepolymer is crosslinked via the terminal unsaturation, a process which does not generate water. Thus, voids and other problems caused by the volatility of water are eliminated during the curing cycle.

The following are examples of methods which can be used to prepare the prepolymer and polymer according to the invention.

EXAMPLE I

To prepare the prepolymer with n=3, a three-necked round-bottom flask was fitted with a mechanical stirrer, thermometer, and reflux condenser. Terephthaldicarboxaldehyde (40.2 g, 0.3 mole), 2,6-dimethylpyridine (also known as 2,6-lutidine) (21.4 g, 0.2 mole), and 2-methyl-5-vinylpyridine (23.8 g, 0.2 mole) with 60 ml of acetic anhydride and 20 ml of acetic acid was introduced. The mixture was stirred and heated at 115° to 120° C. for 24 hours. The reaction temperature was kept below 120° C. to limit reaction of the vinyl groups. After reaction, the prepolymer was purified by neutralizing the acid and isolating the product by solvent-fractionation.

The reaction product (prepolymer) was a reddish brown semi-solid. It was dissolved in tetrahydroform (THF), filtered, and then washed with 10% aqueous sodium hydroxide until the aqueous washing was slightly basic. Finally, the THF solution was washed with three portions of water to remove traces of base. The THF was removed at reduced pressure to yield a reddish brown solid. The solid was taken up in ethyl ether and an equal quantity of pentane was added to separate high molecular weight material. The solution was filtered, and the ethyl ether and pentane was removed at reduced pressure to yield a pale yellow, semisolid, low melting material obtained in 90% yield.

The condensation reaction according to Example I is illustrated by the following formula. In this reaction, the acetic acid served as a catalyst and the acetic anhydride served as a means for absorbing the water of condensation.

A $^1$H nuclear magnetic resonance (NMR) spectrum was run to verify the structure of the product prepared in Example I. The structural assignments for the $^1$H nuclear magnetic resonance spectrum of the prepolymers compared favorably with the theoretically predicted values when n=3, as shown in Table 1. The ratio of terminal vinyl to aromatic and internal protons is very close to the theoretical value, confirming that addition curing polystyryl pyridine had indeed been prepared.

TABLE I

PROTON DISTRIBUTION IN APSP FROM $^1$H NMR SPECTRUM

|  | Number of Protons | Normalized | Ratio |
|---|---|---|---|
| THEORETICAL |  |  |  |
| Aromatic | 24 |  |  |
| Internal-CH=CH— | 12 | 6.0 | 1.00 |
| Terminal Vinyl-CH=CH$_2$ | 6 | 1.0 | 0.17 |
| EXPERIMENTAL |  |  |  |
| Aromatic and Internal | 90 | 6.0 | 1.00 |
| Vinyl | 13 | 1.0 | 0.14 |

The curing behavior of the APSP was studied by differential scanning calorimetry (DSC). FIG. 1 is a DSC curing thermogram made at a thermal scan rate of 20° C./min. The addition reaction begins at 175° C. and continues until about 270° C. The bimodal shape of the exotherm indicates that at least two separate polymerization processes are involved in thermal curing. The heat of polymerization, calculated from the area beneath the curve of FIG. 1 is 9.4 cal/g. This is more than an order of magnitude lower than that measured for other thermoset systems. It may reflect either the low concentration of vinyl groups in the high molecular weight prepolymer or a low heat of polymerization for terminal vinyl groups.

Figure 2:
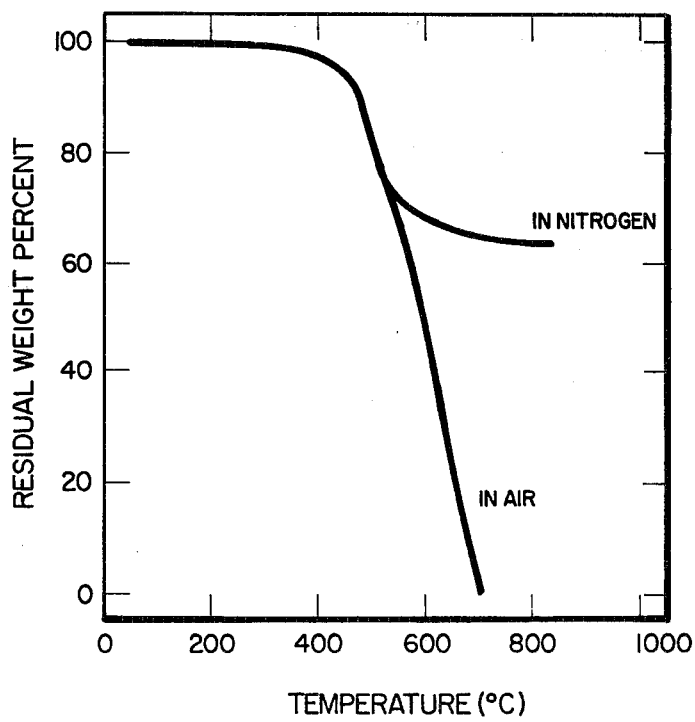
FIG. 2 is a thermogravimetric analysis of polymerized APSP.

A sample of APSP was cured from 25° to 300° C. at 2.5° C./min. in an inert atmosphere and its thermogravimetric characteristics studied in air and in nitrogen. The thermogravimetric curves are shown in FIG. 2. In air, the polymer degrades rapidly above 400° C. The behavior in nitrogen indicates a char yield of 63% to 800° C. This compares favorably with the char yield reported for standard PSP.

EXAMPLE II

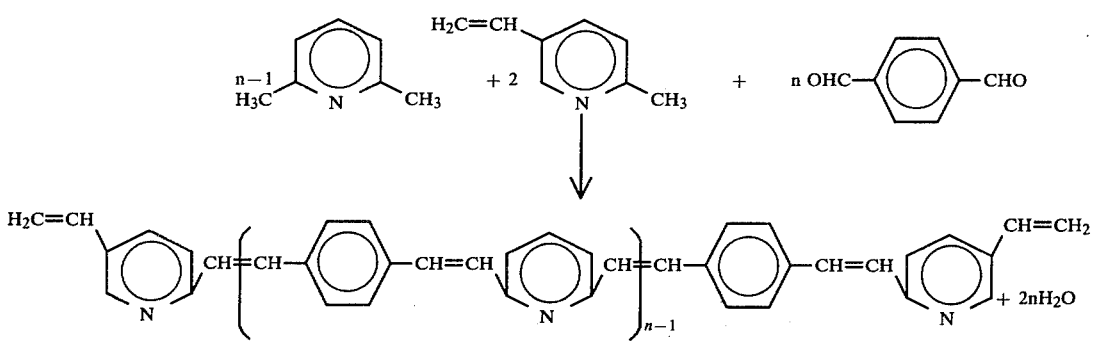

The above equation corresponds to the previously mentioned general equation as follows: The 2,6-lutidine is "P", the 2-methyl-5-vinylpyridine is "E", and the terephthaldicarboxaldehyde is "A". The addition curing polystyryl pyridine product (APSP), as previously mentioned, is then described as E-(-AP)$_{\overline{n}}$AE.

Example II is the same as Example I except that amount of ingredients was changed to the following:

| terephthaldicarboxaldehyde | 53.65 g, 0.4 mole |
|---|---|
| 6,6-lutidine | 53.58 g, 0.3 mole |
| 2-methyl-5-vinylpyridine | 81.75 g, 0.2 mole |

| -continued | |
|---|---|
| acetic anhydride | 102.1 g, 1.0 mole |
| acetic acid | 42.8 g, 0.7 mole |

The APSP product was a similar pale yellow, semi-solid, low melting material obtained in 50% yield.

EXAMPLE III

A mixture is prepared and processed as described for Examples I or II except that the methylated pyridine is 2,4-dimethylpyridine rather than the 2,6-dimethylpyridine, and the methyl vinyl pyridine is 2-methyl-3-vinylpyridine rather than the 2-methyl-5-vinylpyridine. A similar APSP product is obtained.

EXAMPLE IV

A mixture is prepared and processed as described for Examples I or II except that the methylated pyridine is 2,4,6-trimethylpyridine rather than the 2,6-dimethylpyridine. A similar APSP product is obtained.

EXAMPLE V

A mixture is prepared and processed as described for Examples I or II except that the methylated pyridine is 3,4-dimethylpyridine rather than the 2,6-dimethylpyridine. A similar APSP product is obtained.

EXAMPLE VI

A mixture is prepared and processed as described for Examples I or II except that the methylated pyridine is 3,5-dimethylpyridine rather than the 2,6-dimethylpyridine. A similar APSP product is obtained.

EXAMPLE VII

A graphite fiber reinforced composite was prepared from APSP by applying a solution of this polymer (as made according to the previous examples), in tetrahydrofuran to a graphite fabric. After air drying, several of the plies were placed one above the other in a platen and cured at 350° F. for 16 hours. The flexural strength of the resulting composite was 577 MPa. By contrast, to achieve a comparable strength for the condensation type PSP, a minimum cure temperature of 500° F. is required.

The above examples are illustrative of methods which can be used to produce the addition curing polystyryl pyridine which is defined by the attached claims. The proportion of ingredients used to produce various chain lengths and yields can be determined readily using known skills and empirical tests. Other catalysts, solvents and dihydrating methods can be used to obtain the condensation reaction. Similarly, methylated pyridines, methyl vinyl pyridines, and aromatic dialdehydes other than those used to illustrate the invention can be used. Accordingly, it should be clearly understood that the form of the invention described above is illustrative only and is not intended to limit the scope of the claims.

What is claimed is:

1. A prepolymer which comprises the condensation products of a methylated pyridine, an aromatic dialdehyde, and a methyl vinyl pyridine.

2. The prepolymer as claimed in claim 1, wherein said methylated pyridine comprises a dimethyl pyridine and said methyl vinyl pyridine comprises 2-methyl-5-vinylpyridine.

3. The prepolymer as claimed in claim 1 having a formula which contains units of the type:

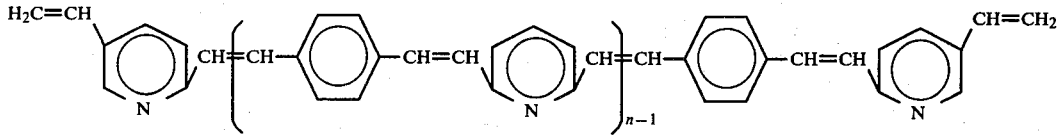

4. A polymer obtained by heating at a temperature of about 175° C.–270° C. of prepolymer according to claim 1.

5. A thermosetting prepolymer which comprises the condensation products of a dimethyl pyridine, terephthaldicarboxaldehyde, and 2-methyl-5-vinylpyridine.

6. A method of preparing a prepolymer which comprises reacting a methylated pyridine, an aromatic dialdehyde, and a methyl vinyl pyridine at a temperature ranging from about 80° C. to 150° C. in the presence of an active anhydride and an acid.

7. The method as claimed in claim 6, wherein said methylated pyridine comprises a dimethyl pyridine, said methyl vinyl pyridine comprises 2-methyl-5-vinylpyridine, said active anhydride comprises acetic anhydride, and said acid comprises acetic acid.

* * * * *